C. APPEL.
Device for Holding Cigars.
No. 64,826.
Patented May 21, 1867.
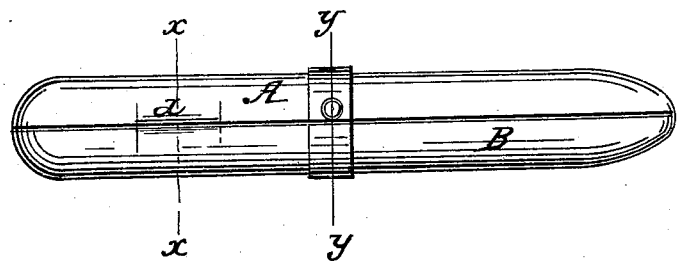
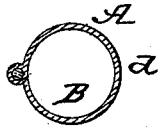 
Witnesses
Theo Tusche
Wm Trewni
Inventor
C. Appel
Per Munn & Co
Attys.

UNITED STATES PATENT OFFICE.

CHARLES APPEL, OF HOBOKEN, NEW JERSEY.

DEVICE FOR HOLDING CIGARS.

Specification forming part of Letters Patent No. 64,826, dated May 21, 1867.

*To all whom it may concern:*

Be it known that I, CHARLES APPEL, of Hoboken, Hudson county, New Jersey, have invented a new and Improved Device for Holding Cigars; and I do hereby declare that the following is a full, clear, and exact description thereof, which will enable others skilled in the art to make and use the same, reference being had to the accompanying drawings, forming part of this specification, in which—

Figure 1 is a side view of my invention. Fig. 2 is a cross-section of the same, taken on the line $x\ x$, Fig. 1. Fig. 3 is a cross-section of the same, taken on the line $y\ y$, Fig. 1.

Similar letters of reference indicate corresponding parts.

This invention relates to a device for holding cigar-stumps and for cutting off the points of cigars.

The object of this invention is to construct an apparatus into which a burning cigar can be laid when the same is not to be smoked, and which can then be placed into the pocket without injury to the cigar and without burning the pocket.

This device will be of great value to smokers when entering cars or ladies' rooms or other places where smoking is prohibited. They can then put the burning cigar into my improved holder, where it will be extinguished, and can be used again when desired. Heretofore on such occasions the cigar had to be thrown away or had to be held until extinguished, thereby frequently occasioning much annoyance.

The invention consists in the use of two semi-cylindrical shells, A and B, which are made of metal or other suitable material, and which are hinged together at one side. Their ends are rounded, and one end is slightly tapering, so as to conform to the shape of a cigar. The size of the shell is such that the same will be just large enough to hold a cigar.

The shells, when closed, are locked by a spring-catch, $a$, secured to the shell A, and catching over a hook, $b$, on the shell B, and can be reopened by pressing against a stud, $c$, on the catch $a$.

To the front edge of the shell A is secured a cutter, $d$, or part of the edge is sharpened, so as to act as a cutter, so that when the shells are being closed the said knife or sharp edge can be used for cutting off the points of cigars.

I claim as new and desire to secure by Letters Patent, as an improved article of manufacture—

A cigar-holder consisting of a combination of the shells A B with the cutter $d$, the latter either being attached to one of the shells or being part of the same, all made and operating substantially as and for the purpose herein shown and described.

CHARLES APPEL.

Witnesses:
ALEX. F. ROBERTS,
J. A. SERVICE.